United States Patent [19]

Nuechterlein

[11] Patent Number: 5,014,180
[45] Date of Patent: May 7, 1991

[54] LOSSLESS SNUBBER CIRCUIT

[75] Inventor: Paul E. Nuechterlein, Rockford, Ill.

[73] Assignee: Sundstrand Corporation, Arlington Heights, Ill.

[21] Appl. No.: 448,312

[22] Filed: Dec. 11, 1989

[51] Int. Cl.$^5$ .................................................. H02H 7/122
[52] U.S. Cl. ........................................ 363/56; 361/90; 361/91; 361/111; 363/98
[58] Field of Search ............... 363/56, 17, 98, 132; 361/90, 91, 111

[56] References Cited

U.S. PATENT DOCUMENTS

| 4,438,486 | 3/1984 | Ferraro . | |
|---|---|---|---|
| 4,502,085 | 2/1985 | Morrison et al. | 361/91 X |
| 4,566,059 | 1/1986 | Gallios et al. . | |
| 4,607,322 | 8/1986 | Henderson . | |
| 4,626,980 | 12/1986 | McGuire . | |
| 4,639,849 | 1/1987 | Noworolski et al. . | |
| 4,691,270 | 10/1987 | Pruitt . | |

Primary Examiner—Steven L. Stephan
Assistant Examiner—Emanuel Todd Voeltz
Attorney, Agent, or Firm—Marshall, O'Toole, Gerstein, Murray & Bicknell

[57] ABSTRACT

A snubber circuit for a power switch includes a capacitor coupled across main current path electrodes of the switch, an inductor having a first end coupled to one of the main current path electrodes of the power switch and a second end and a controllable switch having a first main current path electrode coupled to the second end of the inductor, a second main current path electrode coupled to the other main current path electrode of the power switch and a control electrode. A control circuit is coupled to the power switch and the controllable switch and turns on the controllable switch when a gating signal is commanding turn-on of the power switch and the voltage across the main current path electrodes of the power switch is above a certain level so that the capacitor is discharged through the inductor at such time. The control circuit subsequently turns off the controllable switch and turns on the power switch while the gating signal is commanding turn-on of the latter switch when the voltage across the main current path electrodes thereof falls below the certain level.

9 Claims, 4 Drawing Sheets

LOSSLESS SNUBBER CIRCUIT

TECHNICAL FIELD

The present invention relates generally to switch protection circuitry, and more particularly to a snubber circuit for protecting a power switch.

BACKGROUND ART

Snubber circuits are often utilized to protect power transistors which are used in power converters. Such power switches are typically turned on and off to modulate the flow of power through a load or other circuit. Snubber circuitry is often connected across the main current path electrodes of the power switch to reduce the power dissipated thereby during turn-off. Usually, the snubber circuit includes a capacitor coupled across the main current path electrodes which acts as a shunt path for current which would otherwise flow through the power switch at turn-off. This shunting of currents at turn-off limits the power dissipated by the power switch and thus minimizes the risk of damage to the power switch.

Snubber circuits of the so called "lossless" type have been devised wherein some or all of the power shunted away from the power switch during turn-off is employed for a useful purpose or returned to a source of power. Examples of these types of snubber circuits are disclosed in Ferraro, U.S. Pat. No. 4,438,486, Gallios, et al., U.S. Pat. No. 4,566,059, Henderson, U.S. Pat. No. 4,607,322 (assigned to the assignee of the instant application), McGuire, U.S. Pat. No. 4,626,980, Noworolski, et al., U.S. Pat. No. 4,639,849 and Pruitt, U.S. Pat. No. 4,691,270.

A different problem which arises in the operation of power converters using two or more power switches connected in series across a DC power source concerns the possibility of shoot-through. Typically, such switches are operated by gating signals of which one is an inverted version of the other so that there is no time at which both gating signals are in a state commanding turn-on of both switches However, the characteristics of these power switches may cause a delay in turn-off of one of the switches while the other switch is turned on, thereby resulting in a condition wherein the DC source is short-circuited. Such a shoot-through condition can damage or destroy the power switches. Prior attempts at preventing shoot-through have relied upon the imposition of a short dwell period between a command for turn-off of one transistor and a command for turn-on of the other series-connected power transistor in order to assure that the first transistor is fully off. Other types of circuits have been devised which inhibit turn-on of a power switch until the collector-to-emitter voltage or base-to-emitter voltage of a second power switch connected in series therewith indicates that the latter switch is off.

SUMMARY OF THE INVENTION

In accordance with the present invention, a snubber circuit for a power switch operates in a substantially lossless manner to substantially reduce both turn-on and turn-off losses in the power switches and provides inherent shoot-through prevention capability.

More particularly, a snubber circuit for a power switch includes a capacitor coupled across main current path electrodes of the power switch, an inductor having a first end coupled to the one of the main current path electrodes of the power switch and a second end and a controllable switch operable in on and off states and having a first main current path electrode coupled to the second end of the inductor, a second main current path electrode coupled to the other main current path electrode of the power switch and a control electrode. Means are coupled to the control electrodes of the power switch and the controllable switch and are responsive to a gating signal and a voltage across the main current path electrodes of the power switch for operating the switches whereby the controllable switch is turned on when the gating signal is commanding turn-on of the power switch and the voltage across the main current path electrodes of the power switch is above the certain level so that the capacitor is discharged through the inductor. Such means subsequently turns off the controllable switch and turns on the power switch when the gating signal is commanding turn-on of the latter and the voltage across the main current path electrodes thereof falls below the certain level.

In the preferred embodiment, the operating means comprises a control circuit which prevents turn-on of the power switch when the voltage across the main current path electrodes of such switch is above the certain level. Thus, the power switch is momentarily held off following a turn-on command, thereby preventing shoot-through without the need to provide a dwell interval during which both of a pair of series-connected power switches are commanded to be off. Thus, there is no need for dedicated shoot-through protection circuitry in addition to snubber circuits for the power switches.

DESCRIPTION OF THE PREFERRED EMBODIMENT

Figure 1:
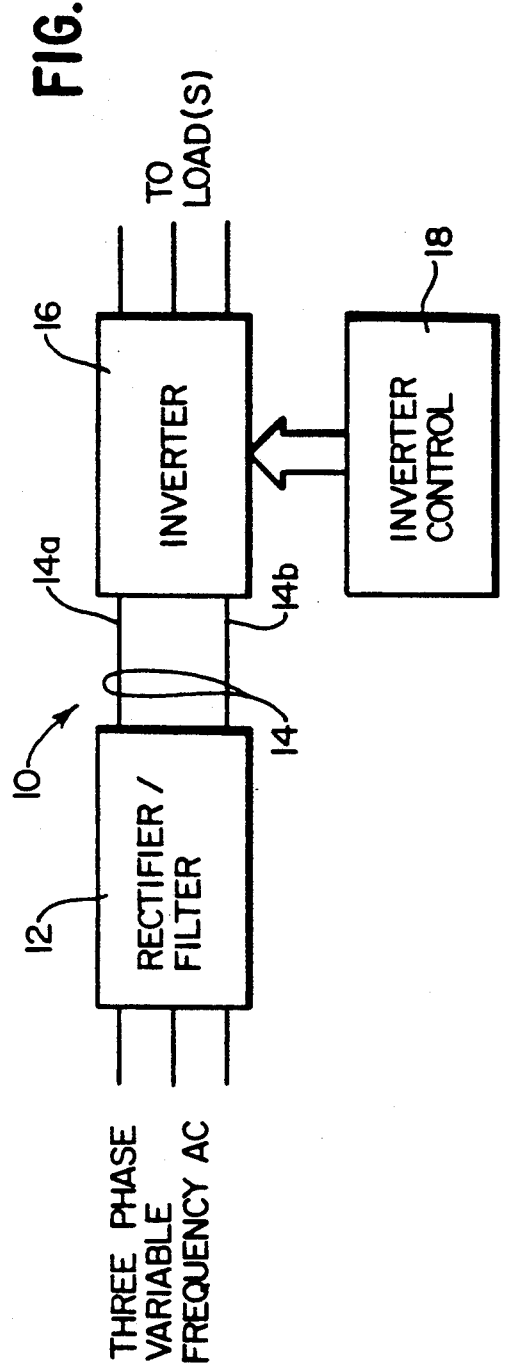
FIG. 1 is a block diagram of a power conversion system.

Referring now to FIG. 1, a power conversion system 10 converts three-phase variable-frequency AC power produced by, for example, a brushless synchronous generator driven by a prime mover into constant-frequency AC power for one or more loads. The power conversion system 10 is known as a variable-speed, constant-frequency (VSCF) power generating system which is adapted to convert the variable-speed motive power produced by an aircraft jet engine into constant-frequency AC power for aircraft loads. It should be noted that the snubber circuit of the present invention is not limited to use with such a system, and in fact may be used in any type of circuit wherein a power switch is operated to modulate the flow of power.

Figure 2:
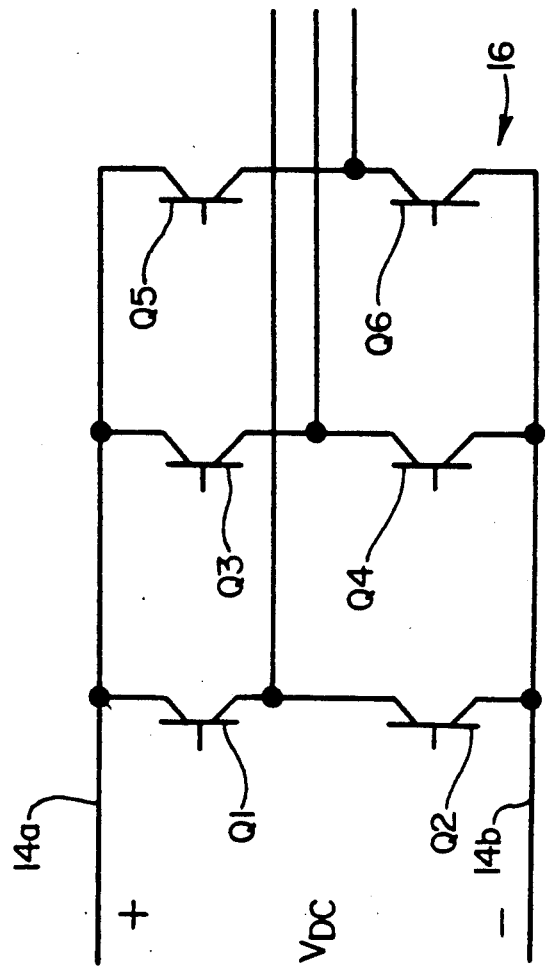
FIG. 2 is a simplified schematic diagram of the inverter of FIG. 1 showing the interconnection of the switches thereof omitting flyback diodes and snubber circuits.

The system 10 includes a rectifier/filter 12 which converts the three-phase variable-frequency AC power into DC power on a DC link 14. The DC link 14 includes conductors 14a and 14b which are coupled to a three-phase static inverter 16 which, as seen in simplified form in FIG. 2, includes six power switches Q1-Q6 which are connected together in a conventional three-phase bridge configuration. The switches Q1-Q6 are operated by an inverter control 18.

Figure 3:
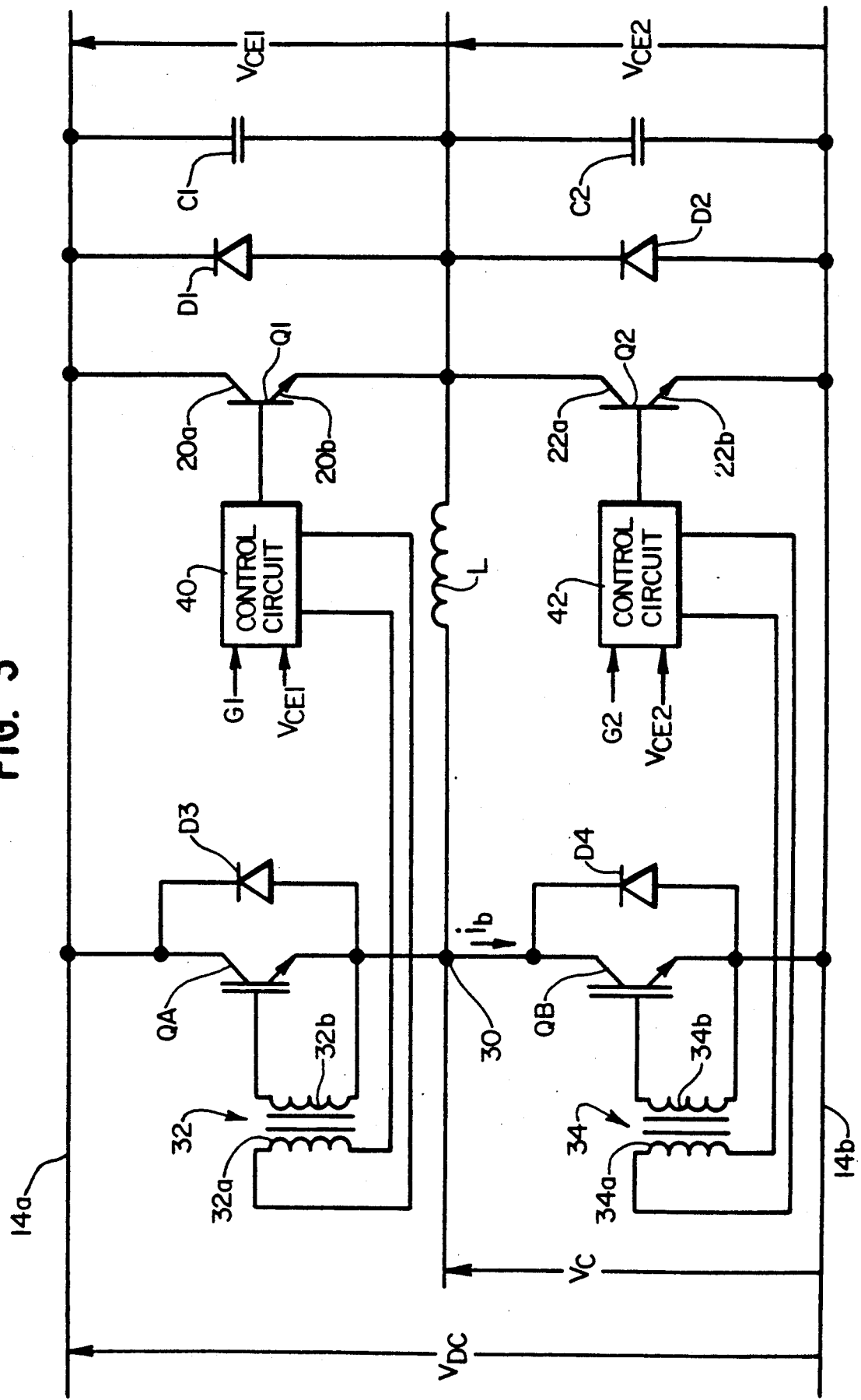
FIG. 3 is a combined schematic and block diagram of one leg of the inverter of FIG. 2 illustrating the snubber circuit of the present invention.

FIG. 3 illustrates one leg of the inverter comprising the switches Q1 and Q2 in greater detail. In the preferred embodiment, each switch Q1 and Q2 is a bipolar transistor having main current path electrodes including a collector 20a, 22a and an emitter 20b and 22b. The collector 20a of the transistor Q1 is coupled to the DC link conductor 14a and thus receives a first, positive DC potential while the emitter 22b of the power switch Q2 is coupled to the DC link conductor 14b and thus receives a second, negative DC potential. The emitter 20b of the power switch Q1 is coupled to the collector 22a of the power switch Q2 at a junction 24 which comprises a phase output.

Connected across the collector and emitter of the power switch Q1 is a parallel combination of a capacitor C1 and flyback diode D1. Likewise, a capacitor C2 and a flyback diode D2 are coupled across the collector and emitter of the power switch Q2. An inductor L includes a first end coupled to the junction 24 and a second end coupled to a junction 30. First and second controllable switches in the form of insulated gate bipolar transistors (IGBT's) QA and QB include main current path electrodes which are coupled together at the junction 30 to form a series combination which is coupled across the DC link conductors 14a and 14b. Specifically, the collector electrode of the IGBT QA is coupled to the DC link conductor 14a, the emitter electrode of the IGBT QA is coupled to the collector of the IGBT QB at the junction 30 and the emitter electrode of the IGBT QB is coupled to the DC link conductor 14b. Control or gate electrodes of the IGBT's QA and QB are coupled to secondary windings 32b, 34b of pulse transformers 32, 34, respectively. First and second control circuits 40, 42 are coupled to the control electrodes or bases of the transistors Q1 and Q2 and are further coupled to primary windings 32a, 34a of the pulse transformers 32, 34, respectively. Each control circuit 40, 42 is responsive to a voltage $V_{CE1}$ or $V_{CE2}$ appearing across the collector and emitter of the transistor Q1 or Q2.

Diodes D3 and D4 are connected across the collector and emitter of the transistors QA and QB, respectively. It should be noted that the IGBT's QA and QB may be replaced by FET's, if desired, in which case the diodes D3 and D4 are not needed.

Figure 4:
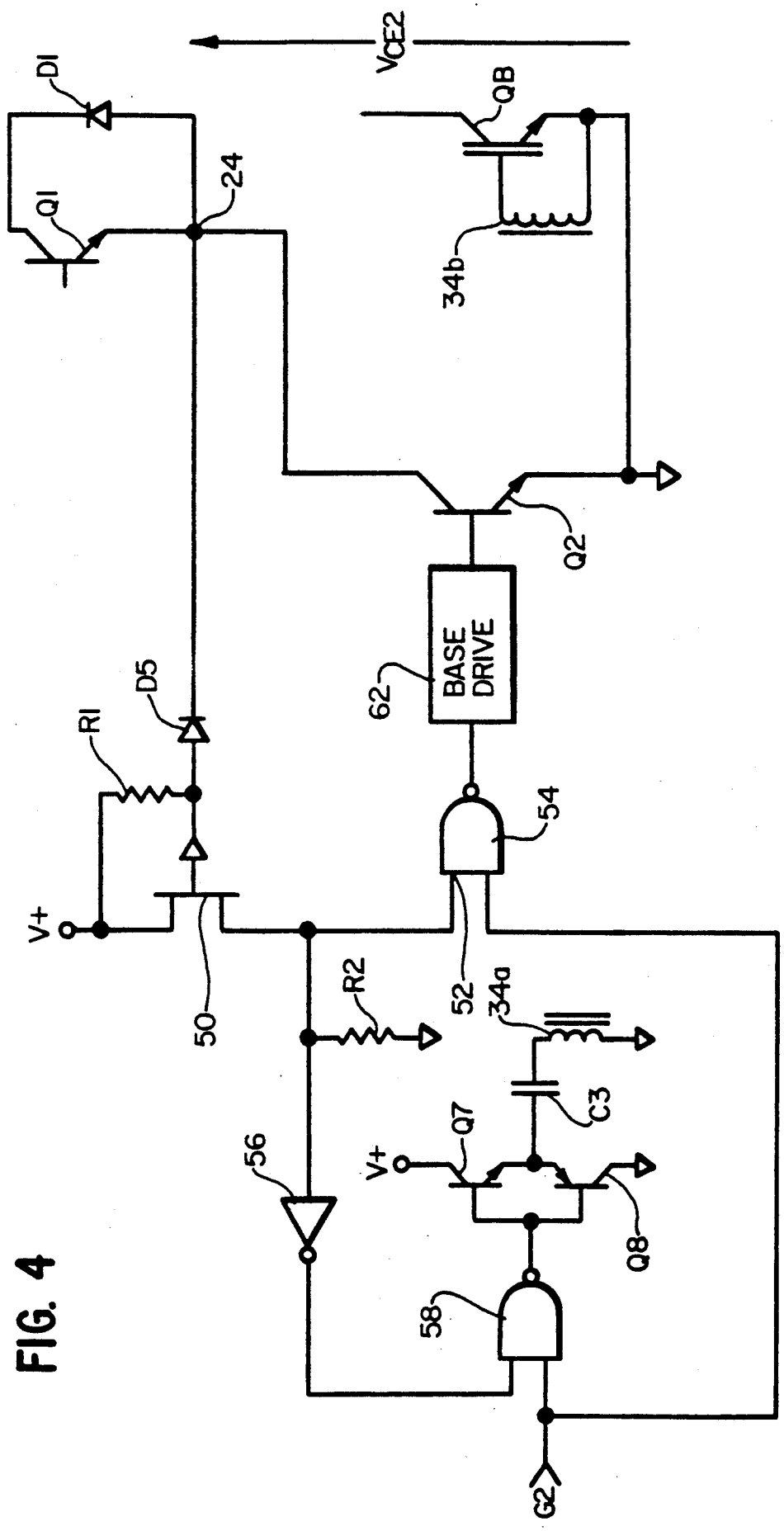
FIG. 4 is a schematic diagram of one of the control circuits of FIG. 3.

Referring now to FIG. 4, the control circuit 42 is illustrated in detail, it being understood that the control circuit 40 is identical thereto. The control circuit 42 includes a diode D5 coupled between the junction 24 and a gate electrode of a P-channel FET 50. A source electrode of the FET 50 is coupled to a voltage source V+ and a resistor R1 is coupled between the source and gate electrodes of the FET 50. A drain electrode of the FET 50 is coupled through a resistor R2 to the second DC potential on the DC link conductor 14b and to a first input 52 of a logic gate 54 comprising an NAND gate. The source electrode of the FET 50 is also coupled to an inverter 56 which is in turn coupled to a first input of a still further NAND gate 58.

A second input of the NAND gate 58 receives the gating signal G2, which is also supplied to a second input of the NAND gate 54. The NAND gate 58 in turn controls a driver circuit comprising transistors Q7, Q8 and capacitor C3 which are turn coupled to the primary winding 34a of the transformer 34.

The NAND gate 54 is coupled to a base drive circuit 62. The base drive circuit 62 provides amplification and isolation as necessary and is coupled to the base of the transistor Q2.

The FET 50 develops a signal at its drain electrode representing the voltage $V_{CE2}$ across the collector and emitter of the transistor Q2. When this voltage is above a certain level, for example 10 volts, the FET 50 is turned off causing a low state signal to be developed at its drain electrode. This low state signal is converted to a high state signal by the inverter 56 and is applied to the first input of the NAND gate 58. If the gating signal G2 is in a high state indicating that the power switch Q2 is commanded to be in the on condition, the output of the NAND gate 58 is in a low state, in turn causing the driver circuit to provide current to the primary winding 34a so that the IGBT QB is turned on. This, in turn, causes the capacitor C2 to discharge through the inductor L and the transistor QB.

When the voltage across the collector and emitter of the transistor Q2 subsequently drops to a certain level, for example 10 volts, the FET 50 turns on, in turn causing a high state signal to be provided to the inverter 56. The inverter 56 inverts this signal to a low state, in turn causing the NAND gate 58 to turn off the driver circuit comprising the transistors Q7 and Q8 and the capacitor C3 so that current no longer flows in the primary winding 34a of the pulse transformer 34. The transistor QB is thereby turned off at this time. At the same time, the high state signal at the source electrode of the FET 50 together with the high state gating signal G2 together cause the output of the NAND 54 to change to a low state. This low state signal is provided to the base drive circuit 62 which renders the transistor Q2 conductive.

As noted previously, the control circuit 40 for the transistor Q1 and the IGBT QA is identical to the control circuit 42.

Figure 5:
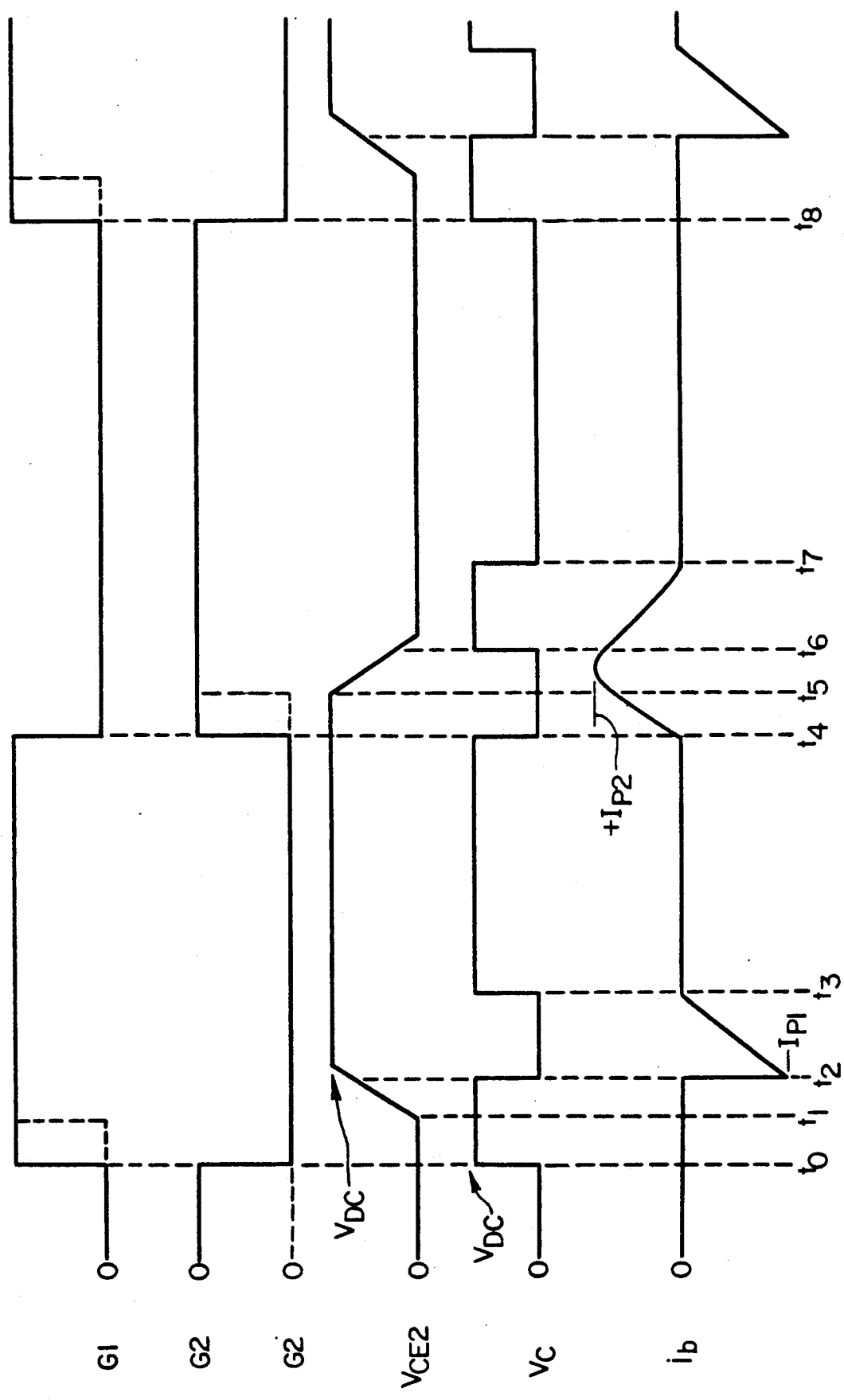
FIG. 5 comprises a series of waveform diagrams illustrating the operation of the snubber circuit and power switches of FIG. 3.

FIG. 5 comprises a series of waveform diagrams illustrating the operation of the present invention. Assume that at a time $t_0$ the gating signal G2 drops to a low state and the gating signal G1 rises to a high state. In response to the high state gating signal G1, the control circuit 40 turns on the transistor QA, and maintains the transistor Q1 in the off state, while the control circuit 42 turns off the transistors QB and Q2. This in turn, causes a voltage $V_C$ across the transistor QB to rise to a high level. At a time $t_1$ following the time $t_0$, the voltage $V_{CE2}$ across the transistor Q2 begins to rise and continues to rise thereafter until the voltage at the junction 24 is within 10 volts of the voltage on the DC link conductor 14a at a time $t_2$. At this time, the transistor QA is turned off and the transistor Q1 is turned on by the control circuit 40. At the time $t_2$, the current which was provided to the inductor L by the transistor QA is instead provided by the diode D4, in turn causing the voltage $V_C$ to drop to a low level. This current flow is illustrated by the waveform diagram for a current $i_b$ which flows in a path between the junction 30 and the point of connection of the cathode of the diode D4 with the collector of the transistor QB. This current flowing entirely through the inductor L increases to a negative peak amplitude $-I_{P1}$ and decreases to zero at a time $t_3$.

At the time $t_3$, the voltage $V_C$ reverts to a high level and remains at such level until a time $t_4$, at which point the gating signals G1 and G2 switch state. At this time, the transistor QB is turned on while the transistors QA, Q1 and Q2 are turned off. The voltage $V_{CE2}$ across the transistor Q2 initially remains substantially at the voltage $V_{DC}$ across the DC link conductors 14a, 14b until a time $t_5$ as the current $i_b$ through the inductor L and the transistor $Q_B$ increases. Following the time $t_5$, the voltage $V_{CE2}$ across the transistor Q2 decreases until the voltage reaches approximately 10 volts at a time $t_6$. At this time, the transistor QB is turned off and the transistor Q2 is turned on by the control circuit 42, in turn causing the current which was flowing through the inductor L and the transistor QB to instead flow through the inductor L and the diode D3. The voltage at the junction 30 therefore changes to a high level until a time $t_7$, at which point current ceases to flow through the inductor L.

Following the time $t_7$, the switching sequence described above repeats beginning at a time $t_8$.

As the foregoing explanation demonstrates, each power switch Q1, Q2 is held off for a short time following a command for turn-on of such switch by the associated gating signal G1 or G2 until the voltage across the collector and emitter electrodes thereof drops to a particular level. This provides a high degree of immunity against shoot-through, and hence this protective function is accomplished without separate circuits dedicated to such function. Thus, a desirable reduction in parts is obtained, thereby leading to a desirable decrease in size, weight and cost.

In addition to the foregoing advantages, losses in the power switches Q1 and Q2 are substantially reduced during both turn-on and turn-off. In addition to the direct benefits of reduced cooling requirements, improved efficiency and better reliability, the reduced switching losses permit the magnitudes of turn-on and turn-off pulses for the power switches to be reduced. This permits a desirable simplification in the circuits which drive the power switches and results in less power dissipation by such circuits. Also, the reduction in turn-on and turn-off pulse magnitudes results in a desirable reduction in the minimum on-time for the power switches in turn resulting in smaller and lighter filter elements between the power switches and the load.

In some cases, it may be desirable to provide a small amount of dead time between turn-on of one of the transistors Q1 or Q2 and turn-off of the other transistor, by delaying the rising edge of each of the gating signals G1 and G2. This is represented by the dotted lines in the waveforms of FIG. 5 and provides a further degree of immunity against shoot-through.

I claim:

1. A snubber circuit for a power switch having main current path electrodes and a control electrode and alternately operated in on and off states in response to a gating signal, comprising:
   a capacitor coupled across the main current path electrodes;
   an inductor having a first end coupled to one of the main current path electrodes of the power switch and a second end;
   a controllable switch operable in on and off states and having a first main current path electrode coupled to the second end of the inductor, a second main current path electrode coupled to the other main current path electrode of the power switch and a control electrode; and means coupled to the control electrodes of the power switch and the controllable switch and responsive to the gating signal and a voltage across the main current path electrodes of the power switch for operating the switches whereby the controllable switch is turned on when the gating signal is commanding turn on of the power switch and the voltage across the main current path electrodes of the power switch is above a certain level so that the capacitor is discharged through the inductor and whereby the controllable switch is subsequently turned off and the power switch turned on when the gating signal is commanding turn-on of the latter switch and the voltage across the main current path electrodes thereof falls below the certain level.

2. The snubber circuit of claim 1, whereby the operating means comprises a control circuit including a logic gate which prevents turn-on of the power switch when the voltage across the main current path electrodes of such switch is above the certain level.

3. The snubber circuit of claim 2, wherein the logic gate comprises a NAND gate which receives the gating signal and a signal representing the voltage across the main current path electrodes of the power switch.

4. The snubber circuit of claim 1, wherein the operating means includes a logic gate which controls the controllable switch and which receives the gating signal and a signal representing the voltage across the main current path electrodes of the power switch.

5. The snubber circuit of claim 4, wherein the logic gate comprises a NAND gate.

6. The snubber circuit of claim 4, wherein the operating means further includes a pulse transformer coupled between the logic gate and the control electrode of the controllable switch.

7. A power converter, comprising:
   a transistor having a collector, an emitter and a base and operated in response to a gating signal;
   a snubber circuit coupled to the transistor including a capacitor coupled across the collector and emitter, an inductor having a first end coupled to one of the collector and emitter and a second end and a controllable switch operable in on and off states and having a first main current path electrode coupled to the second end of the inductor, a second main current path electrode coupled to the other of the collector and emitter of the transistor and a control electrode; and
   a control circuit coupled to the base of the transistor and the control electrode of the controllable switch and responsive to the gating signal and a voltage $V_{CE1}$ across the collector and emitter of the transistor for operating the transistor and the controllable switch whereby the controllable switch is turned on and the transistor is prevented from turning on when the gating signal is commanding turn-on of the transistor and the voltage $V_{CE1}$ is above a certain level so that the capacitor is discharged through the inductor and whereby the controllable switch is subsequently turned off and the transistor turned on when the gating signal is commanding turn on of the transistor and the voltage $V_{CE1}$ falls below the certain level.

8. The power converter of claim 7, wherein the transistor collector is coupled to a first DC potential and further including a second transistor having a base, a collector coupled to the emitter of the first-named transistor at a junction there between and an emitter coupled to a second DC potential and wherein a second snubber circuit is coupled across the collector and emitter of the second transistor and a second control circuit is coupled to the base of the second transistor and is responsive to a second gating signal which comprises an inverted version of the first-named gating signal.

9. The power converter of claim 8, wherein the first end of the inductor is coupled to the junction between the transistors and wherein the second snubber circuit includes a second capacitor coupled across the collector and emitter of the second transistor and a second controllable switch operable in on and off states and having a first main current path electrode coupled to the first DC potential, a second main current path electrode coupled to the second end of the inductor and a control electrode and wherein the second control circuit is coupled to the base of the second transistor and the control electrode of the second controllable switch and is further responsive to a voltage $V_{CE2}$ across the collector and emitter of the second transistor for operating the second transistor and the second controllable switch whereby the second controllable switch is turned on and the second transistor is prevented from turning on when the second gating signal is commanding turn-on of the second transistor and the voltage $V_{CE2}$ is above a second certain level so that the second capacitor is discharged through the inductor and whereby the second controllable switch is subsequently turned off and the second transistor turned on when the second gating signal is commanding turn-on of the second transistor and the voltage $V_{CE2}$ falls below the second certain level so that a shoot-through condition caused by simultaneous conduction of the transistors is prevented.

* * * * *